May 2, 1967 F. VAN DAM 3,317,663

DEVICE FOR CINEMATOGRAPHICALLY RECORDING THE SCREEN IMAGE OF TELEVISION DISPLAY TUBES

Filed Oct. 30, 1963

INVENTOR
FRANS VAN DAM
BY
Dean, Fairbank & Hirsch
ATTORNEYS 3,317,663

DEVICE FOR CINEMATOGRAPHICALLY RECORDING THE SCREEN IMAGE OF TELEVISION DISPLAY TUBES

Frans van Dam, Rotterdam, Netherlands, assignor to N.V. Optische Industrie "De Oude Delft," Delft, Netherlands Filed Oct. 30, 1963, Ser. No. 320,081
Claims priority, application Netherlands, Nov. 5, 1962, 285,065
6 Claims. (Cl. 178—6.7)

This invention relates to devices for cinematographically recording the screen image of television display tubes incorporated in a closed circuit television system. Such systems usually include a synchronizing generator, further termed herein the "master oscillator," whose frequency is adjustable, and the recording device comprises a cinematographic camera driven by a motor of the synchronous type.

In order to obtain a good cinematographic record with such a device it is essential that the frame frequency of the camera has a fixed ratio to the image frequency of the television display. If the camera is provided with a shutter it is a further requisite that the phase of the television picture corresponds to the phase of the shutter action, thus, that the shutter starts decovering the film at the time the electron beam in the display tube starts writing a field of the television picture. If these two conditions cannot be fulfilled horizontal dark or light "bars" will appear in the recorded pictures, which bars, in case of unmatched frequencies, will move up and down the image when the film is projected.

A fixed ratio between the camera frequency and the television picture frequency can be established rather simply in a closed circuit television system having a master oscillator which is clamped to the frequency of the supplying A.C. mains, by using a cinematographic camera which is driven by a synchronous motor receiving its current from the same mains. By properly selecting the gearing between the motor and the camera shutter the required frequency ratio is then automatically established. It may be observed, meanwhile, that in the conventional television systems working with interlacing fields the ratio between the two frequencies depends on whether single fields or complete pictures should be recorded. The value selected for this ratio is not essential in the concept of the present invention.

Phase synchronization is more difficult to establish. The time at which the shutter covers the film again must lie in the so-called field blanking period. In a system satisfying the two conditions mentioned above always exactly a complete number of image fields will be included in one film frame and the appearance of bars will be prevented. The use of a synchronous motor does not offer a solution for the problem of phase synchronization due to the fact that with such motors the position of the rotor relative to the rotating field is not necessarily always the same.

One solution of this problem could be to make the stator of the synchronous motor angularly adjustable and to provide the camera with an optical view finder permitting observation of the image such as it would appear on the film through the shutter. With the camera running, the motor stator must then be turned in one direction or the other until the filmed picture is free from the bar. One disadvantage of this system is that the adaptation is time and film consuming. Even if the synchronization process would be automated this drawback would still be felt since relatively high powers must be controlled which tend to make the system slow.

Hereinbefore only cameras have been discussed which are provided with a shutter. The use of a shutterless camera is perfectly feasible for the purpose indicated provided that during the film transport no image is displayed on the screen. This is the case e.g. if the film is transported quickly during the short field blanking period normally available between two consecutive fields or pictures. It is also possible, in order to increase the time interval available for transporting the film, to suppress by electronic means between each pair of television pictures to be recorded one or more complete fields. Finally, shutterless cameras can be used in which the film is fed across the image gate at a constant rate instead of intermittently, optical compensation means such as rotating polygonal prisms being then provided which move in synchronism with the film to stop image motion during the exposure and to switch the light beam from one frame to the next and the end of the exposure. In all such cases, essentially the same problem presents itself as was described hereinbefore in connection with cameras having shutters. In these cases too the phase of the television image should correspond to the phase of the cinematographic camera in such a manner that each film frame covers one or more complete fields. The phase of the camera is meant herein to indicate the timing of the intermittent film transport, or the timing of the change-over of the compensation means from one film frame to the next.

The invention may be applied with equal effect in systems with or without a camera shutter, and has for its principal object to provide a simple and relatively rapidly working automatic control of the relative phase of the camera and the television picture.

Broadly, in the device according to the present invention, the camera is provided with means for generating a cyclically modulated electrical signal whose phase has a predetermined relation to the position of the driven shaft of the camera. This signal is applied to a phase detector which controls the master oscillator of the television system in such a manner that the field synchronizing signal derived from the master oscillator is clamped in phase to the electrical signal derived from the camera.

Thus, in accordance with the invention, the condition of a fixed cycling frequency ratio between the recording camera and the television display device is satisfied by clamping the master oscillator of the television circuit to a signal derived from the driven shaft of the camera. As this signal has a predetermined phase relation to the position of the camera shaft, the phase of the master oscillator output signal and, consequently, the phase of the field synchronizing signal is likewise linked to the position of the driven camera shaft.

In a preferred form of the device according to the invention the driven shaft of the camera or a further shaft coupled thereto bears a light modulating element rotatable therewith having a varying opacity in circumferential direction and which element is mounted between a light source and a photo-electric cell in such manner that the cell produces during rotation of the shaft a cyclically modulated signal which has a predetermined phase relation to the position of the shaft carrying the element.

In a specific embodiment of the invention the opacity of the light modulating element in circumferential direction varies according to a sine wave. The number of optical cycles to be incorporated in the element depends on the type of television system used and on the cycling frequency of the camera.

The invention will be explained in detail with special reference to a device having a cinematographic camera with a rotating shutter.

Analogous application of the invention to other kinds of cameras, as discussed hereinbefore, is feasible and will be evident to those skilled in the art.

Figure 1:
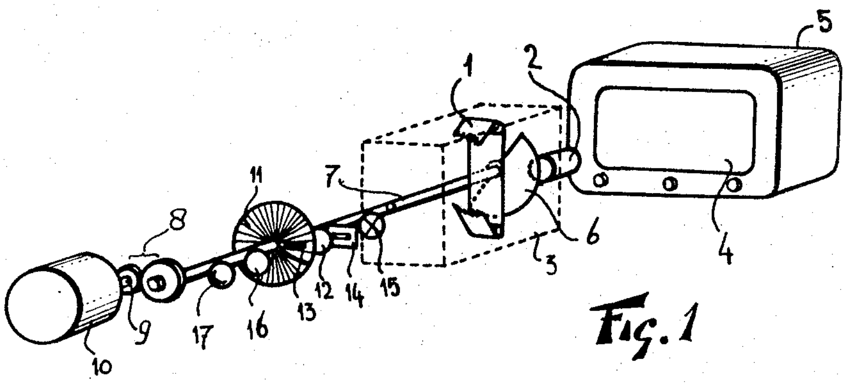
FIG. 1 represents in diagrammatic form the mechanical and optical parts of a device according to the invention.

Referring to FIG. 1 on the film 1 the lens 2 of the cinematographic camera 3 projects an image of the screen 4 of the television-display device 5. The camera 3 has a rotating blade shutter 6 which is mounted on a shaft 7 which through a pair of gears 8 is coupled to a shaft 9 of an electric motor 10 of the synchronous type. On shaft 7 a disc shaped element 11 is mounted whose opacity in circumferential direction varies sinusoidally.

Figure 2:
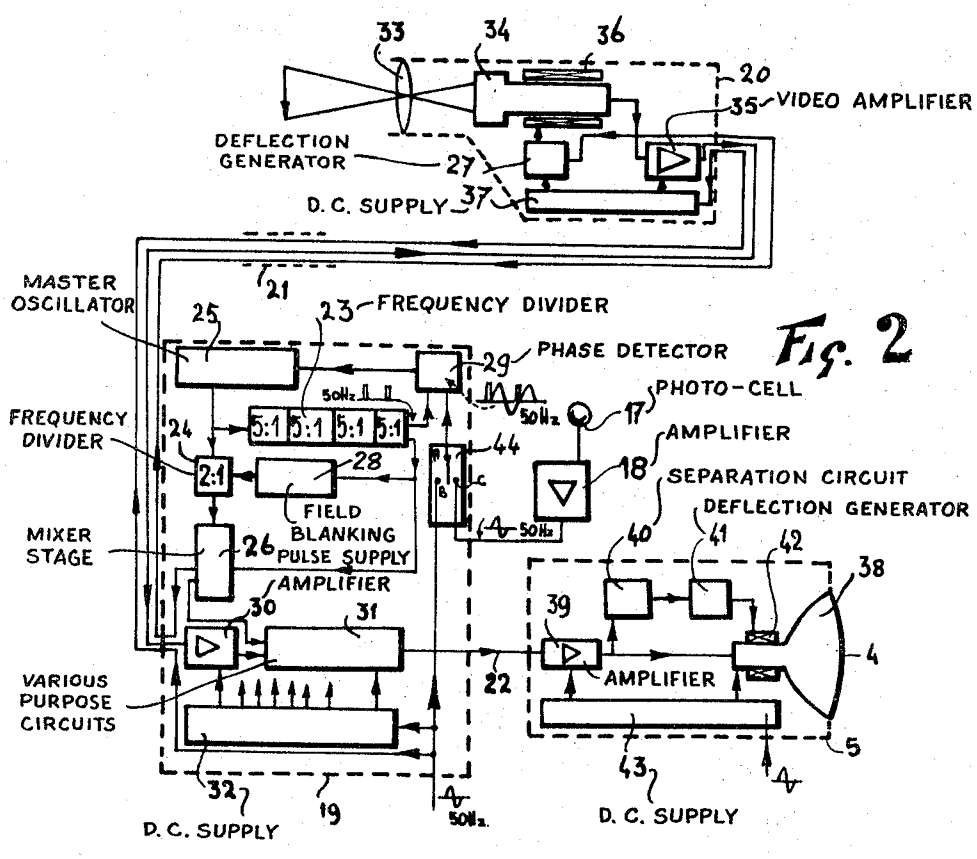
FIG. 2 shows a block schematic diagram of a closed circuit television system adapted to the invention.

A lens 12 projects onto the disc 11 an image 13 of a narrow slit 14 which is illuminated by a light source 15. The light which is transmitted by the disc 11 is focussed by a lens 16 on the photocathode of a photoelectric cell 17. The output signal of the photocell 17 is fed to an amplifier 18 (FIG. 2). It will be evident that the output signal of the photocell is a sine wave having a fixed phase relation to the position of the camera shutter 6.

Broadly the closed circuit television system shown in FIG. 2 comprises three units, i.e. a central unit 19, a camera unit consisting of one or more television cameras, such as 20, and a display unit consisting of one or more display devices such as 5. The television camera 20 is connected to the central unit by a cable 21, the display device 5 by a cable 22.

The central unit contains a synchronizing generator or master oscillator 25 and two frequency dividers 23 and 24 which derive from the output of the master oscillator the field synchronizing signal and line synchronizing signal, respectively. A mixer stage 26 adds these two signals and applies them through cable 21 to the deflection generators 27 of the camera 20. Furthermore, a circuit 28 is included which supplies the field blanking pulses and a phase detector 29 which performs a function, further to be described hereinafter, in synchronizing the master oscillator.

In the lower part of the central unit a number of other circuits have been shown such as the amplifier 30 and the combined circuit 31 which includes mixer stages, circuits for the restoration of D.C. components, etc. As these circuits may be of conventional design and have no bearing on the present invention, they will not further be described herein. The output signal of this part of the central unit is a complete television signal including, in addition to the video signal, all required synchronizing pulses and this signal is fed to the display unit 5. The central unit finally contains a supply part 32 providing the central unit with the required D.C. voltages.

The television camera 20 has a lens 33 projecting an image of a scene onto the mosaic of a pick-up tube 34. This image is scanned in the usual manner according to a line pattern by an electron beam, thus generating a video signal which is applied to a camera amplifier 35. The electron beam is deflected by magnetic fields generated by deflection coils 36 which receive their saw-tooth currents from the deflection generators 27. The camera has its own supply circuit 37 which receives its A.C. power from the central unit. The output signal of the camera which through the cable 21 is fed to the input amplifier 30 of the central unit 19 contains only video information but no synchronizing pulses. The latter are added to the signal by the circuit 31.

The complete television signal thus obtained is supplied from the central unit to the display unit 5 through cable 22. This unit comprises a cathode ray tube 38, having a display screen 4, and an amplifier 39. The output signal of this amplifier is applied on the one hand to the control grid of the image tube 38 and on the other hand to a conventional separation stage 40 in which the synchronizing pulses are separated from the video signal. The electron beam in the image tube is deflected by the magnetic fields of deflection coils 42 receiving current from deflection generators 41 which derive their synchronizing signals from the separation stage 40. The display unit is further provided with a supply unit 43 having its own mains connection.

In closed circuit television systems as described herein it is usual to clamp the frequency of the master oscillator to the frequency of the A.C. mains. In these systems the field frequency is then equal to the mains frequency. It is furthermore usual to form the complete television picture from two interlaced fields. To make certain that the correct interline distance is maintained, it is necessary that the line synchronizing signal and the field synchronizing signal are strongly coupled to each other. In order to secure this the frequency of the master oscillator is set to twice the line frequency. Consequently in a system having 625 lines for a complete picture (i.e. two fields) and a mains frequency of 50 cycles per second the frequency of the master oscillator is $2\times25\times625=31{,}250$ c.p.s. The frequency divider 24 renders a reduction by a factor 2 such that the mixing stage 26 receives the correct line frequency of $25\times625=15{,}625$ c.p.s. The field synchronizing pulses are derived from the signal of the master oscillator by the frequency divider 23 which, in the example chosen, must render a frequency transform of 625 to 1, divided in four stages of 5 to 1. The phase detector 29 now compares in a conventional and well-known manner the phase of the field synchronizing pulses to the phase of the mains voltage. If deviations from a predetermined phase relation occur, e.g. if the field synchronizing pulses do not coincide with the passages through zero of the main voltage, a control signal is generated in the phase detector which is fed back to the master oscillator. The frequency of the output signal of the master oscillator is thereby changed to an extent and for a time interval such that the phase difference as detected by the phase detector 29 is reduced to zero. Since the line synchronizing pulses are likewise derived from the output signal of the master oscillator which is thus clamped to the mains voltage, these pulses are also clamped to the field synchronizing pulses.

In the system illustrated a selection switch 44 is accommodated in the supply lead for the reference signal to the phase detector 29. This switch has two positions A–B and A–C. In the position A–B the phase detector is connected with the mains, in which case the normal clamping action as discussed above is taking place. The contact C of switch 44 is connected to the photocell 17 of FIG. 1 through the amplifier 18.

In the example given above of 25 television pictures with 50 c.p.s. supply current and 625 lines per complete picture, a frame frequency of 25 frames per second is often used for the cinematographic camera 3. The shutter blade 6 then has an exposure angle of 180° and of each television picture only one field is filmed whereas the duration of the other field is used for feeding the film.

In the arrangement illustrated the disc 11 rotates at 25 revolutions per second. In order to permit the use of the output signal of amplifier 18 as the reference signal for the 50 c.p.s. system the opacity of this disc varies in circumferential direction in such manner that the sine wave signal includes two full waves. The position of the disc 11 with respect to the shaft 7 can be set so that the decovering of the image gate of the camera 3 by the shutter blade is coincident with a zero passage of the photocell signal.

This signal is now applied to the contact C of switch 44 and if this switch is turned to the position A–C the master oscillator 25 will adapt itself to this new reference signal in just the same manner as described above. Field synchronizing signal and shutter will then be coupled in fixed phase relation and any phase deviations that might occur, e.g. due to load variations of the driving motor, will be automatically adjusted.

The signal of the photocell 17 will reach a stable frequency only at the end of the starting period of motor 10. Consequently, during that period the master oscillator would have to go through a very large range of control. This disadvantage can be overcome by switching the switch 44 to the position A–B during the starting period. Thus, each time the device is put to work the master oscillator is first synchronized with the mains. Only after the motor 10 has arrived at its nominal speed the system is changed-over to shutter synchronization by switching the switch 44 to position A–C. In order to minimize loss of film it will be found advantageous to automize this switching action, e.g. by using a time relay which is set to a time delay slightly longer than the normal starting period of the motor.

Instead of the optical method of generating the cyclic reference signal described hereinbefore, obviously many other methods may be used, such as opening and closing a switch in a D.C. circuit by means of an arm on the shaft 7. The pulses generated may be reshaped for use as a reference signal by means of suitable filters. Also, the shaft 7 could be provided with a rotating magnet inducing in a stationary coil an A.C. voltage whose phase is determined by the position of shaft 7.

In case, in the system described, a different frame frequency of the camera is required, the device can be adapted thereto by relatively simple means. If it is desired e.g. to take 12.5 frames per second (of each four television fields only two are used to expose the film and these two form one complete picture in the interlaced system) then the camera runs at half speed. The frequency of the signal produced by photocell 17, however, should be 50 c.p.s. in this case too. To comply with this condition disc 11 can e.g. be replaced by a disc having the double number, that is four full waves.

In a simple device in accordance with the invention which is adaptable to two frame frequencies (25 and 12.5 frames per second), a convertible synchronous motor having e.g. two-pole and four-pole field for 3000 r.p.m. and 1500 r.p.m., respectively, may be used whose shaft carries a light modulating blade having a light transmitting sector smaller than 180° and which drives through a reduction gearing of 2:1 the shaft of the camera shutter. On both sides of the motor shaft a light source and a corresponding photocell are mounted. If the camera is running at the highest frame frequency only one of the photocells is in action. This photocell then generates 50 pulses per second from which pulses a reference signal of this frequency can be derived. If the camera motor should run at 1500 r.p.m. for the frame frequency of 12.5 frames per second, both photocells are switched in parallel in such manner that the pulses of one cell are generated exactly in the midst of the time interval between the pulses of the other cell. The reference signal thus obtained is completely the same to that generated at the highest frame frequency.

It will be evident that in a similar manner by using higher numbers of photocells and associated light sources still other frame frequencies may be established.

I claim:

1. A device for cinematographically recording the screen image of television display tubes incorporated in a closed circuit television system, which system includes a master oscillator whose frequency is adjustable, said device being provided with a cinematographic camera driven by a synchronous motor, characterized in that the camera comprises means to generate a cyclically modulated electrical signal whose phase has a predetermined relation to the position of the driven shaft of the camera, said signal being applied to a phase detector controlling the master oscillator in such manner that the field synchronizing signal drived from the master oscillator is clamped in phase to the electrical signal obtained from the camera.

2. A device as claimed in claim 1, wherein the driven shaft of the camera or a shaft fixedly coupled therewith, carries a light modulating element rotatable with said shaft and having a varying opacity in circumferential direction, said element being positioned so as to move between a light source and a photo-electric cell whereby the photo-electric cell generates a cyclically modulated signal having a predetermined phase relation with respect to the position of the shaft carrying said element.

3. A device as claimed in claim 2, wherein the opacity of the light modulating element varies in circumferential direction in accordance with a sine wave.

4. A device as claimed in claim 1, wherein a change-over switch is provided which, in one position, applies to the phase detector a signal derived from the A.C. mains to which the system is connected, and, in the other position applies to the phase detector said cyclically modulated signal obtained from the camera.

5. A device as claimed in claim 4, wherein the change-over switch is activated by a time relay.

6. A device as claimed in claim 2 which is adaptable to at least two different camera frame frequencies, wherein the light modulating element is a rotating blade having at least one light transmitting sector smaller than 180° and is movable between at least two light sources and at least two photocells individually associated with said light sources, switching means being provided for using, dependent on the selected frame frequency, either the output signal of one of such photocells or the combined output signals of a combination of such photocells for the purpose of deriving the cyclically modulated reference signal.

References Cited by the Examiner

UNITED STATES PATENTS

| | | | |
|---|---|---|---|
| 2,486,717 | 11/1949 | Maurer | 178—7.4 |
| 2,600,868 | 6/1952 | Hales | 178—6.7 |

DAVID G. REDINBAUGH, *Primary Examiner.*

H. W. BRITTON, *Assistant Examiner.*